(12) United States Patent
Iijima et al.

(10) Patent No.: US 6,967,043 B2
(45) Date of Patent: Nov. 22, 2005

(54) METHOD OF MANUFACTURING THE DENSELY FITTED MULTI-LAYER CARBON NANO-TUBE

(75) Inventors: Sumio Iijima, Aichi (JP); Masako Yudasaka, Ibaraki (JP); Akira Koshio, Mie (JP)

(73) Assignees: Japan Science and Technology Agency, Saitama (JP); NEC Corporation, Tokyo (JP)

(*) Notice: Subject to any disclaimer, the term of this patent is extended or adjusted under 35 U.S.C. 154(b) by 7 days.

(21) Appl. No.: 10/495,212
(22) PCT Filed: Nov. 5, 2002
(86) PCT No.: PCT/JP02/11520
§ 371 (c)(1),
(2), (4) Date: Jul. 7, 2004
(87) PCT Pub. No.: WO03/057621
PCT Pub. Date: Jul. 17, 2003

(65) Prior Publication Data
US 2004/0265491 A1 Dec. 30, 2004

(30) Foreign Application Priority Data
Jan. 8, 2002 (JP) .................................. 2002-001815

(51) Int. Cl.$^7$ ..................... C23C 14/32; C23C 16/448; C23C 16/505; C23C 16/513; C23C 16/26
(52) U.S. Cl. .................. 427/577; 427/534; 427/535; 427/569; 427/249.1; 427/903; 423/445 B; 423/447.1
(58) Field of Search ............. 423/447.2, 447.3, 423/460, 461, 445 R, 445 B, 447.1; 204/157.47, 192.12, 192.15; 427/449, 450, 451, 534, 535, 569, 577, 585, 249.1, 255.4, 903

(56) References Cited

U.S. PATENT DOCUMENTS

5,424,054 A * 6/1995 Bethune et al. .......... 423/447.2
5,641,466 A * 6/1997 Ebbesen et al. ......... 423/447.2

FOREIGN PATENT DOCUMENTS

| JP | 05-238718 A | * | 9/1993 |
| JP | 07-061803 | | 3/1995 |
| JP | 09-188509 | | 7/1997 |
| JP | 2000-327317 A | * | 11/2000 |

OTHER PUBLICATIONS

Sano et al., "Viability of sub–0.4–nm diameter carbon nanotubes", Physical Review B, vol. 66, 113403, Sep. 12, 2002.*
Sun et al., "Materials: Creating the narrowest carbon nanotubes", Nature, vol. 403, 384, Jan. 27, 2000.*
Peng et al., "Smallest diameter carbon nanotubes", Appl. Phys. Lett., vol. 77, No. 18, 2831, Oct. 30, 2000.*
Lu–Chang, Qin et al., Nature, vol. 408, p. 50 (2000).
Zhao, X. et al., Carbon, vol. 35, pp. 775–781 (1997).
Koshio, Akira et al., Chem. Phys. Lett., vol. 356, pp. 595–600 (2002).

* cited by examiner

Primary Examiner—Timothy Meeks
Assistant Examiner—Wesley D. Markham
(74) Attorney, Agent, or Firm—Wenderoth, Lind & Ponack, L.L.P.

(57) ABSTRACT

A method of manufacturing, with high purity and high efficiency, a multi-wall carbon nanotube (10) having layers densely fitted to the center part thereof, comprising the step of leading a graphite rod (2) into plasma flame (1) generated in the atmosphere of inert gas (4) added with hydrogen to evaporate carbon so as to stack the densest multi-wall carbon nanotube (10) on the surface of the graphite rod (2).

9 Claims, 6 Drawing Sheets

METHOD OF MANUFACTURING THE DENSELY FITTED MULTI-LAYER CARBON NANO-TUBE

TECHNICAL FIELD

The invention of the patent application of this case relates to a method of manufacturing a densest multi-wall carbon nanotube, and particularly, to a method of manufacturing a densest multi-wall carbon nanotube provided with carbon nanotube layers formed up to the center thereof with high purity and high efficiency.

BACKGROUND ART

Many studies have been made to utilize carbon nanotubes as conductors of micro-electronic elements, electrodes such as FPDs, microstructures and high-strength material adsorbents.

This carbon nanotube comprises a graphite sheet having a cylindrically rounded form and may be classified into a single-wall carbon nanotube with a single sheet and a multi-wall carbon nanotube with plural sheets overlapped telescopically on each other. Many of generally well known single-wall carbon nanotubes have a diameter of 1 to 2 nm and a length of several μm. As to many multi-wall carbon nanotubes, the diameter of the outermost layer is several tens nm, the diameter of the innermost layer is several μm to 10 nm and the length is several μm.

Meanwhile, in recent years, a multi-wall carbon nanotube has been discovered in which although the diameter of the outermost layer is likewise about 10 nm, layers are densely formed up to the center and the diameter of the finest layer at the innermost side is about 0.4 nm. Such a diameter as small as about 0.4 nm in the innermost carbon nanotube is not only the finest among those which have been discovered so far but also a size equal to the molecular diameter of $C_{20}$ which is the smallest fullerene and is such a fineness limit that a carbon nanotube smaller than this does not exist stably. Namely, this is a multi-wall carbon nanotube densely fitted to the limit where no more tube is generated in the inside.

The characteristics of this densest multi-wall carbon nanotube are that it is chemically stable like usual multi-wall carbon nanotubes and, in addition, it is considered that this densely fitted carbon nanotube is more improved in mechanical strength. Also, it has been clarified that the innermost carbon nanotube having a diameter of 0.4 nm has metallic qualities.

As a method of manufacturing a densest multi-wall carbon nanotube such as those aforementioned, a method in which a carbon nanotube is produced by arc discharge using a carbon electrode in a hydrogen atmosphere has been already reported. However, this method has the drawback that the amount of the multi-wall carbon nanotube is very small and the resulting carbon nanotube has many impurities.

The invention of the patent application of this case has been made in the situation as aforementioned and it is an object of the invention to solve the prior art problem and to provide a method of manufacturing a densest multi-wall carbon nanotube with high purity highly efficiently.

DISCLOSURE OF INVENTION

Accordingly, the invention of the patent application of this case provides the following inventions to solve the aforementioned problem.

Specifically, the invention of the patent application of this case first provides a method of manufacturing a densest multi-wall carbon nanotube, the method comprising depositing the densest multi-wall carbon nanotubes primarily on the surface of a graphite rod by introducing the graphite rod into plasma flame generated in an inert gas atmosphere added with hydrogen to vaporize carbon.

Also, in the above inventive method of manufacturing a densest multi-wall carbon nanotube, the invention of the patent application of this case provides, second, a production method wherein a plasma with a frequency as high as 4 MHz or more is used, third a production method wherein the temperature of the center part of the plasma flame is 5000° C. or more, fourth a production method wherein the tip of the graphite rod is made to have a cone form, fifth a production method wherein the graphite rod is introduced from the end of the plasma flame such that the tip of the graphite rod is disposed at the center part of the plasma flame, sixth a production method wherein, when the plasma flame has a elliptic sphere form having a minor axis about 30 mm in length and a major axis about 60 mm in length, the densest multi-wall carbon nanotube is deposited on the surface of the graphite rod at a place having such a positional relation to the plasma flame that it is disposed at a distance of 5 to 15 mm in the direction of the major axis from the center of the plasma flame, seventh a production method wherein the amount of the hydrogen added to the inert gas is 2 to 10%, eighth a production method wherein the inert gas is Ar, ninth a production method wherein the inert gas is introduced as internal rotation gas rotating inside of the plasma, outside radial gas flowing straight outside of the plasma and outside rotation gas rotating outside of the plasma, tenth a production method wherein the flow rate of the inert gas is designed as follows: the flow rate of the internal rotation gas is 15 ml/min, the flow rate of the outside radial gas is 15 ml/min and the flow rate of the outside rotation gas is 20 ml/min.

BEST MODE FOR CARRYING OUT THE INVENTION

The invention of the patent application of this case has the characteristics as aforementioned. An embodiment of the invention will be hereinafter explained. First, the densest multi-wall carbon nanotube in the invention of the patent application of this case indicates a multi-wall carbon nanotube which is provided with layers densely formed up to the center and has such an extreme fineness that the innermost finest layer has a diameter as small as about 0.4 nm as aforementioned. And, it is an object of the invention of the patent application of this case to obtain a densest multi-wall carbon nanotube primarily in a high yield. Although there is the possibility of the multi-wall carbon nanotube including multi-wall carbon nanotubes in which the diameter of the innermost finest layer is larger than about 0.4 nm, the invention produces a multi-wall carbon nanotube fitted densely with layers at a density of at least 50% or more and ideally 100%.

Figure 1:
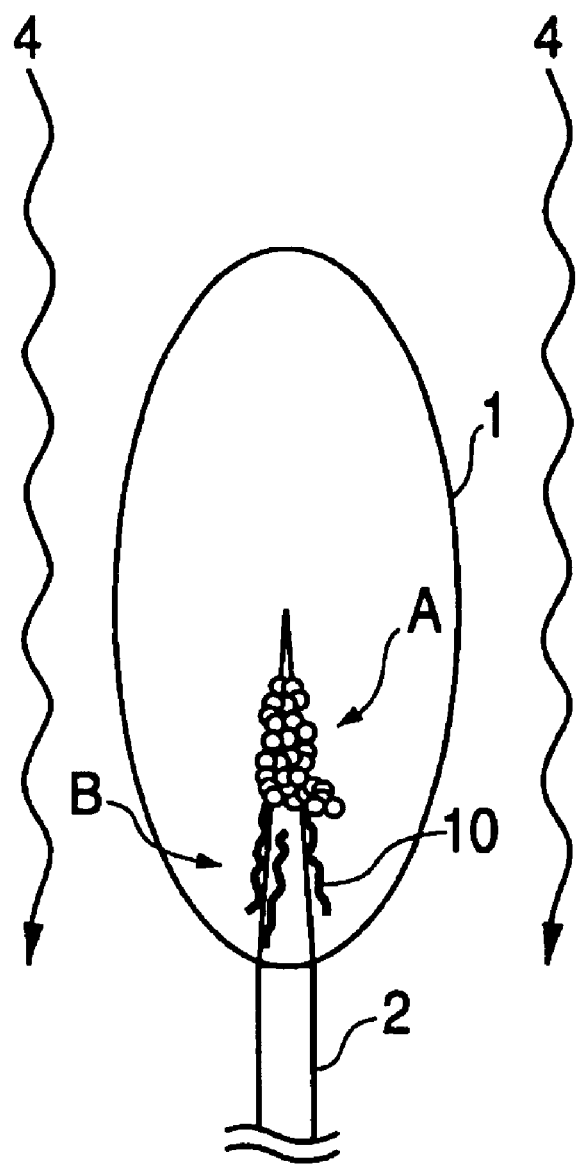
FIG. 1 is a schematic view of a method of manufacturing a densest multi-wall carbon nanotube according to the invention of the patent application of this case.

A schematic view of a method of manufacturing a densest multi-wall carbon nanotube provided by the invention of the patent application of this case is illustrated in FIG. 1. In the method of manufacturing a densest multi-wall carbon nanotube (10) according to the invention of the patent application of this case, a graphite rod (2) is introduced into a plasma flame (1) generated in an inert gas (4) atmosphere added with hydrogen to vaporize carbon thereby depositing primarily the densest multi-wall carbon nanotubes (10) on the surface of the graphite rod (2), whereby the densest multi-wall carbon nanotube (10) can be manufactured.

In the invention of the patent application of this case, the plasma flame (1) used to vaporize carbon is very important. The temperature of the center part of the plasma flame (1) is preferably 5000° C. or more to vaporize carbon highly efficiently. Also, because the plasma flame (1) can be stably maintained even under high gas pressure, it is preferable to use, for example, a radio-frequency plasma having a frequency of 4 MHz or more.

The atmosphere in which this plasma (1) is generated is made to be the inert gas (4) added with hydrogen. As the inert gas (4), rare gas such as Ar (argon), He (helium) or Ne (neon) may be used. It is preferable to use Ar as the inert gas (4) which can generate the plasma flame (1) more stably. The concentration of the hydrogen to be added in the inert gas (4) atmosphere may be designed to be about 2 to 10% and preferably about 10%.

This inert gas (4) is introduced as internal rotation gas rotating inside of the plasma, outside radial gas flowing straight outside of the plasma and outside rotation gas rotating outside of the plasma and it is thereby possible to maintain the stable plasma flame (1) even under high gas pressure. Further, as to the flow rate of the inert gas, the following condition is exemplified as preferable condition: the flow rate of the internal rotation gas is 15 ml/min, the flow rate of the outside radial gas is 15 ml/min and the flow rate of the outside rotation gas is 20 ml/min.

As the graphite rod (2) as raw material in the invention of the patent application of this case, a carbon sintered body or porous body or the like having a purity of about 99% or more may be used. When the purity of the graphite rod (2) is dropped, this is undesirable because impurities such as amorphous carbon and the like are increased. It is unnecessary to add a metal as a catalyst to this graphite rod (2). Also, as to the shape of the graphite rod (2), there is no particular limitation to the diameter, length and the like of the graphite rod as far as the tip of the graphite rod (2) can be introduced into the plasma flame (1) and it is possible to adopt an optional shape corresponding to the type of plasma generator to be used and the size of the plasma flame (1). In examples shown as preferable ones, the graphite rod (2) is made to be thick to the extent that it can be introduced into the center part having a higher temperature in the plasma flame (1) and it is more preferable that the tip part of the graphite rod (2) is made into a cone form like a pencil.

This graphite rod (2) is introduced into the plasma flame (1) to vaporize carbon. It is preferable to introduce the graphite rod (2) from the direction of the top of the plasma flame (1) such that the tip of the graphite rod (2) is located at the center of the plasma flame (1). The vaporized carbon is forced by carrier gas and deposited on the surface of the graphite rod (2) slightly apart from the center part of the plasma flame (1). These deposits are deposited as separated two deposits, namely a cotton-like deposit A and a film-like deposit B as shown in A and B in FIG. 1. The densest multi-wall carbon nanotube (10) can be obtained as the cotton-like deposit A. To state more specifically, when the plasma flame (1) has, for example, an elliptic sphere form having a minor axis about 30 mm in length and a major axis about 60 mm in length, the densest multi-wall carbon nanotube (10) can be obtained as a cotton-like deposit on the surface of the graphite rod (2) at a place having such a positional relation to the plasma flame that it is disposed at a distance of 5 to 15 mm in the direction of the major axis from the center of the plasma flame.

The densest multi-wall carbon nanotube (10) is grown and deposited together with carbon fine particles such as amorphous carbon. However, according to the method of the invention of the patent application of this case, the densest multi-wall carbon nanotube at this place on the surface of the graphite rod (2) has a very high purity as much as 95% or more. Also, since a metal catalyst and the like are not used in the graphite rod (2) used as the raw material, impurities such as metal particles are not mixed. Further, according to the method of the invention of the patent application of this case, it is better than anything that the densest multi-wall carbon nanotube (10) can be obtained in a very high yield as much as about 95 to 98%.

According to the method of the invention of the patent application of this case as aforementioned, the densest multi-wall carbon nanotube (10) can be manufactured with high purity in a high yield. This is very useful for the studies of, for example, various characteristics and growth mechanisms of a diameter of 0.4 nm carbon nanotube which is the innermost layer of the densest multi-wall carbon nanotube (10). It is also expected that a multi-wall carbon nanotube having higher mechanical strength than current multi-wall carbon nanotubes having a hollow core is provided in a large amount at low cost.

The embodiments of the invention will be explained in more detail by way of examples.

EXAMPLES

Figure 2:
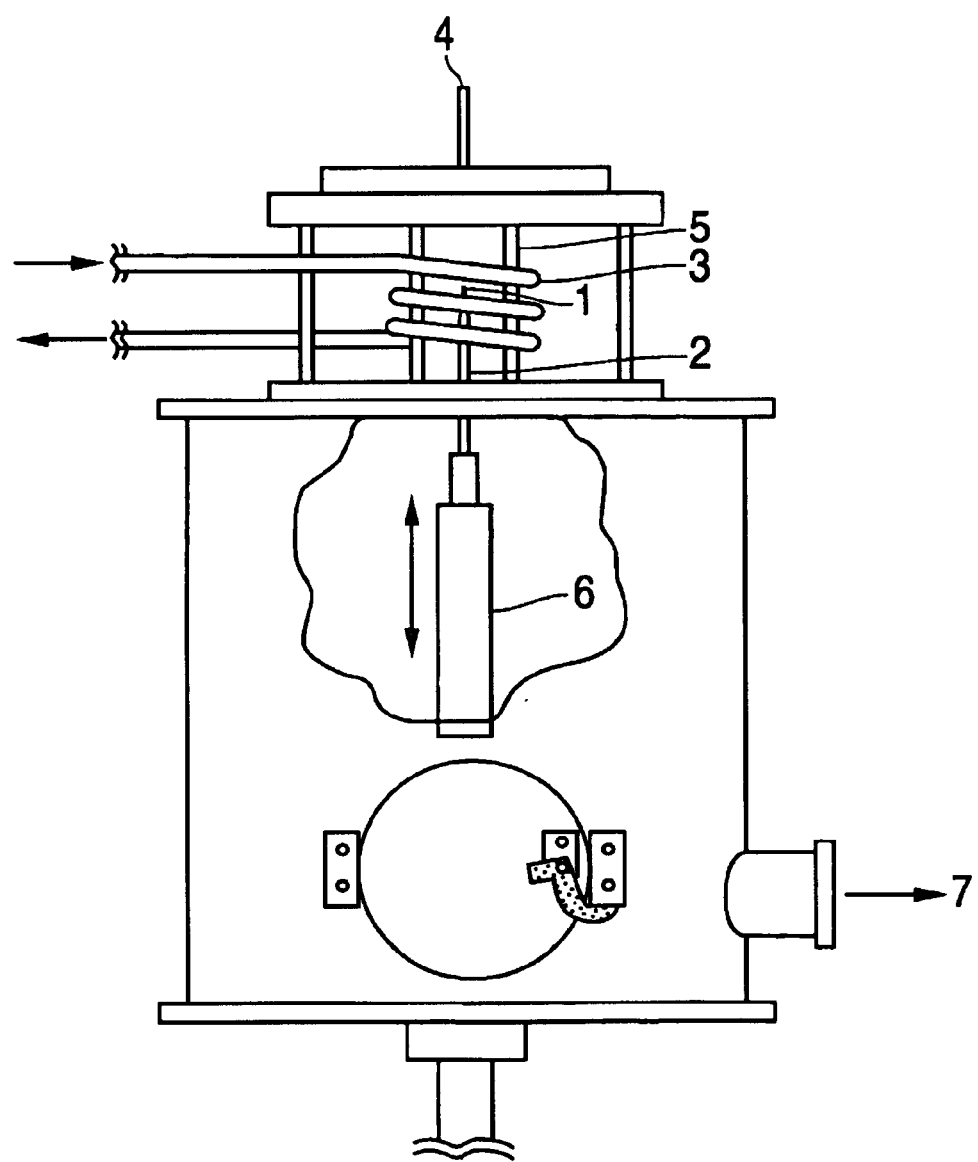
FIG. 2 is a view illustrating a radio-frequency plasma generator used in examples.

A densest multi-wall carbon nanotube was manufactured using a radio-frequency plasma generator shown in FIG. 2. First, an inert gas (4) added with hydrogen was supplied to the inside of a quartz tube (5) and radio-frequency current of about 4 MHz was applied to a copper inductive coil wound around the outer periphery of the quartz tube (5) to generate a radio-frequency plasma (1). Ar was used as the inert gas (4) and the flow rate of the Ar gas in the quartz tube (5) was set as follows: the flow rate of the internal rotation rotating in the plasma (1) gas was 15 ml/min, the flow rate of the outside radial gas flowing straight outside of the plasma (1) was 15 ml/min and the flow rate of the outside rotation gas rotating outside of the plasma (1) was 20 ml/min, so as to stabilize the plasma flame (1) for a long time. The amount of the hydrogen to be added to the Ar gas was set to 2 ml/min. The inert gas (4) added with hydrogen was discharged from a discharge port (7) by a rotary pump.

A graphite rod (2) surrounded by induction coil 3 was introduced into the center part of the plasma flame (1) generated in this manner by using a vertically movable graphite rod holder (6) to vaporize carbon. Then, a densest multi-wall carbon nanotube having a purity of 95% or more was obtained as a cotton-like deposit on the surface of the graphite rod at a place about 15 to 20 mm from the tip of the graphite rod. Thus, the densest multi-wall carbon nanotube was obtained in an amount of t se tens and several mg in about 15 minutes.

Figure 3A:
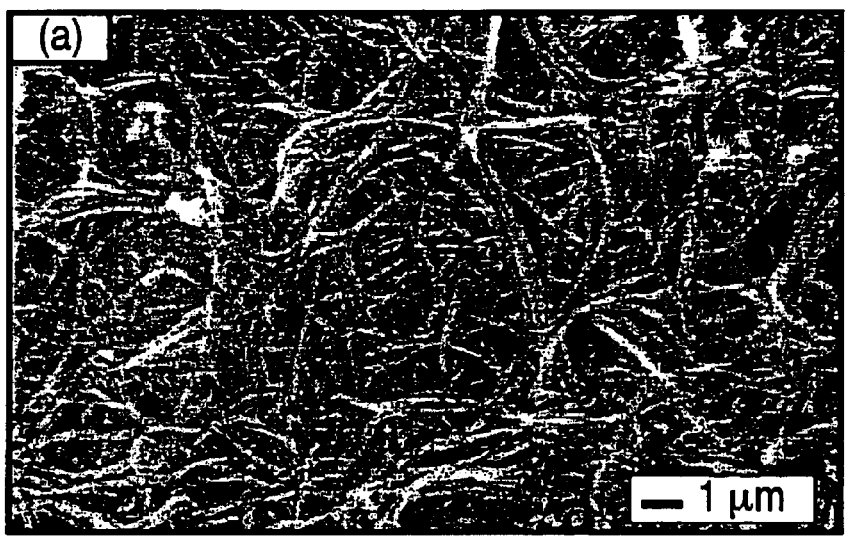
FIGS. 3(a) and 3(b) are views illustrating a scanning electron microscope (SEM) image of a densest multi-wall carbon nanotube obtained by a method according to the invention of the patent application of this case.
Figure 3B:

Scanning electron microscope (SEM) images of the resulting the densest multi-wall carbon nanotube are shown in FIGS. 3(a) and 3(b). It was confirmed that in this densest multi-wall carbon nanotube, the diameter and length of the outermost layer were about 10 nm and several μm respectively and many layers could be piled to form a bundle about 100 to 500 nm in thickness.

Figure 4:
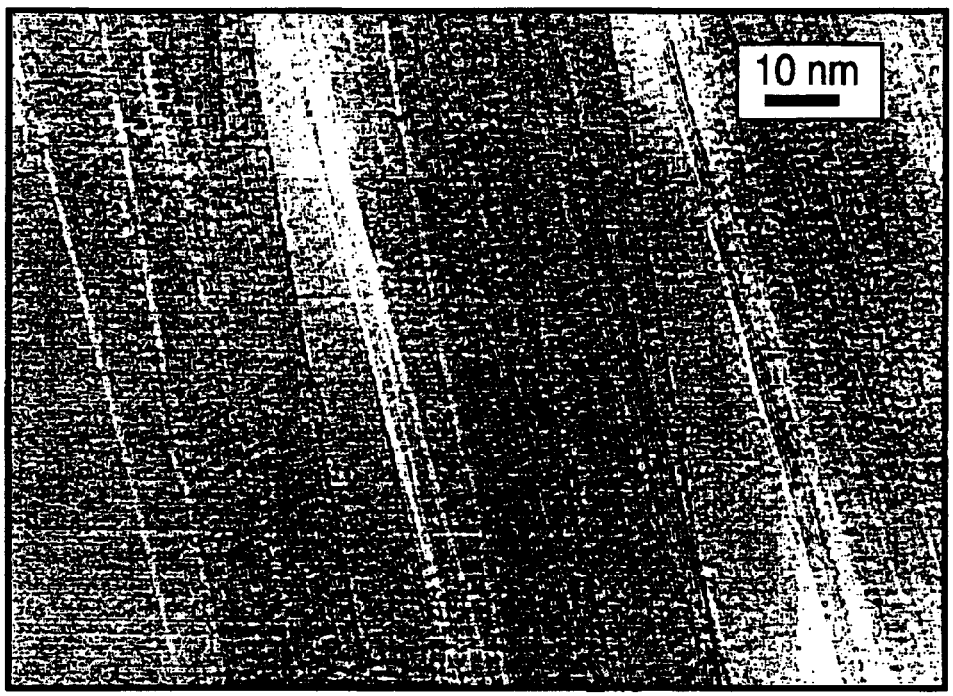
FIG. 4 is a view illustrating a transmission electron microscope (TEM) image of a multi-wall carbon nanotube obtained by a method according to the invention of the patent application of this case.
Figure 5:
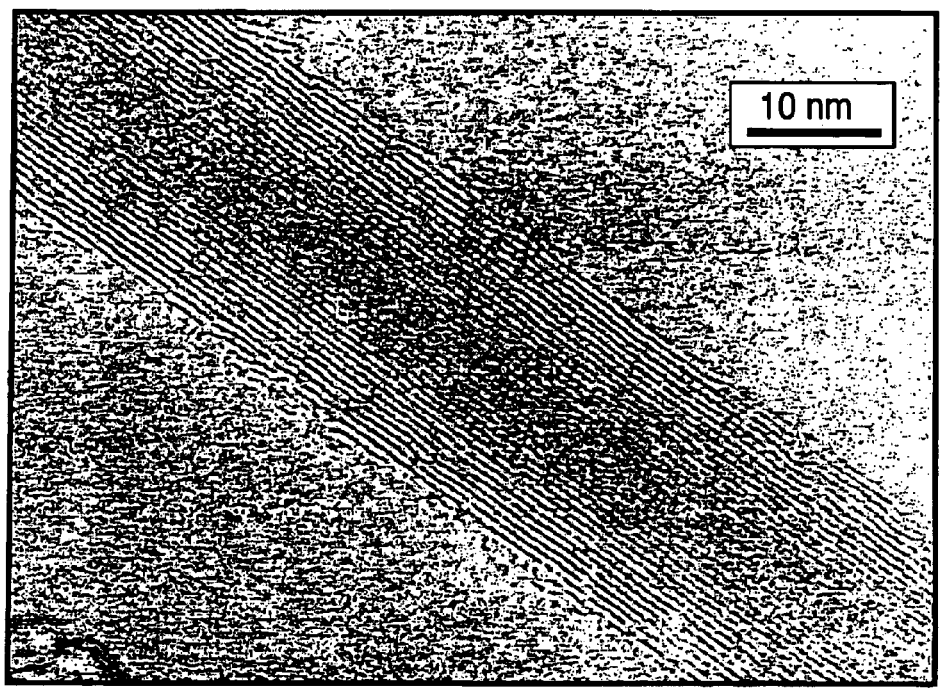
FIG. 5 is a view illustrating a transmission electron microscope (TEM) image of a multi-wall carbon nanotube obtained by a method according to the invention of the patent application of this case.

Transmission electron microscope (TEM) images of the resulting the densest multi-wall carbon nanotube are shown in FIGS. 4 (bundle) and 5 (single body). As is clear from these figures, it was confirmed that the densest multi-wall carbon nanotube obtained in the method of the invention of the patent application of this case was a multi-wall carbon nanotube in which about 10 to 20 layers of graphite sheet were densely fitted to the center part and the diameters of the outermost and innermost layers were 10 nm and about 0.4 nm respectively.

Figure 6:
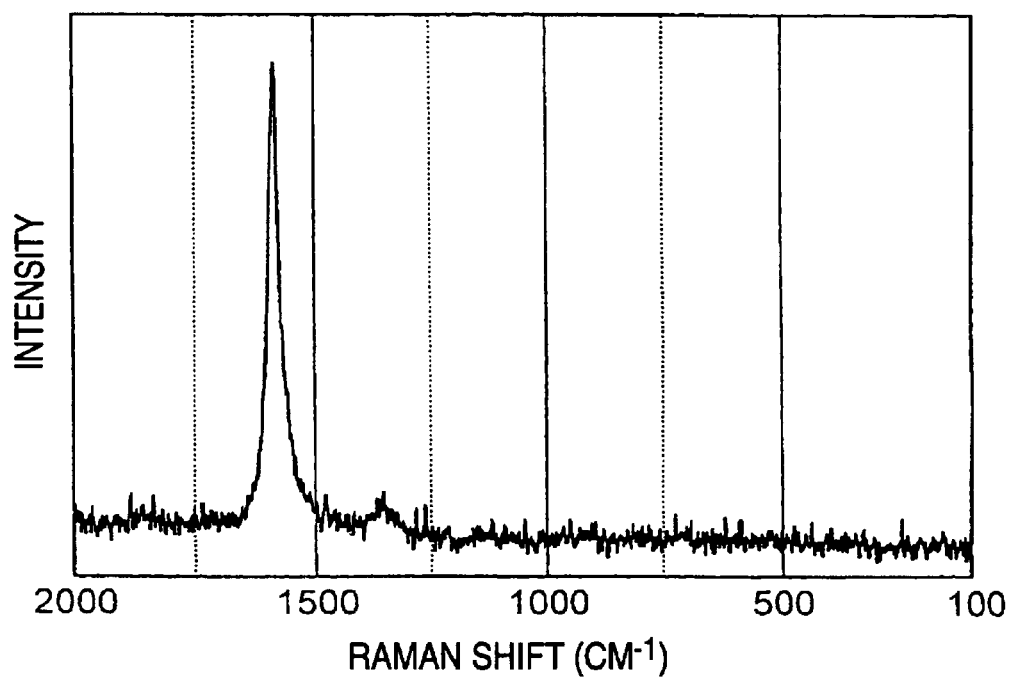
FIG. 6 is a view illustrating the Raman spectrum of a densest multi-wall carbon nanotube according to the invention of the patent application of this case.

FIG. 6 shows the Raman spectrum of the resulting densest multi-wall carbon nanotube. It is confirmed that this densest multi-wall carbon nanotube was formed of very fine graphite layers.

It is needless to say that this invention is not limited to the above examples and various modifications of the details are possible.

INDUSTRIAL APPLICABILITY

As explained above in detail, a method of manufacturing a densest multi-wall carbon nanotube provided with carbon nanotube layers formed densely up to the center part thereof with high purity highly efficiently is provided by the invention.

What is claimed is:

1. A method of manufacturing densest multi-wall carbon nanotubes having an innermost tube diameter of about 0.4 nm, the method comprising depositing the densest multi-wall carbon nanotubes primarily on the surface of a graphite rod by introducing the graphite rod into a plasma flame generated in an inert gas atmosphere added with hydrogen to vaporize carbon.

2. The method of manufacturing densest multi-wall carbon nanotube according to claim 1, wherein a plasma with a frequency of 4 MHz or more is used.

3. The method of manufacturing densest multi-wall carbon nanotubes according to claim 1, wherein the temperature of the center part of the plasma flame is 5000° C. or more.

4. The method of manufacturing densest multi-wall carbon nanotube according to claim 1, wherein the tip of the graphite rod is made to have a cone form.

5. The method of manufacturing densest multi-wall carbon nanotubes according to claim 1, wherein the graphite rod is introduced from the top of the plasma flame such that the tip of the graphite rod is disposed at the center part of the plasma flame.

6. The method of manufacturing densest multi-wall carbon nanotubes according to claim 1, wherein the amount of the hydrogen added to the inert gas is 2 to 10 vol %.

7. The method of manufacturing densest multi-wall carbon nanotubes according to claim 1, wherein the inert gas is Ar.

8. The method of manufacturing densest multi-wall carbon nanotubes according to claim 1, wherein the inert gas is introduced as internal rotation gas rotating inside of the plasma, outside radial gas flowing straight outside of the plasma and outside rotation gas rotating outside of the plasma.

9. The method of manufacturing densest multi-wall carbon nanotubes according to claim 8, wherein the flow rate of the inert gas is designed as follows: the flow rate of the internal rotation gas is 15 ml/min, the flow rate of the outside radial gas is 15 ml/min and the flow rate of the outside rotation gas is 20 ml/min.

* * * * *